United States Patent [19]

D'Hont

[11] Patent Number: 5,247,304
[45] Date of Patent: Sep. 21, 1993

[54] INTERROGATING STATION FOR IDENTIFICATION PURPOSES, WITH SEPARATE TRANSMITTING AND RECEIVING ANTENNAE

[75] Inventor: Loek D'Hont, Ak, Netherlands

[73] Assignee: Texas Instruments Incorporated, Dallas, Tex.

[21] Appl. No.: 824,659

[22] Filed: Jan. 23, 1992

[51] Int. Cl.⁵ .......................................... G01S 13/76
[52] U.S. Cl. ...................................................... 342/44
[58] Field of Search ................................... 342/42, 44

[56] References Cited

U.S. PATENT DOCUMENTS

| 3,363,247 | 1/1968 | Chausse et al. | 342/44 |
| 3,713,102 | 1/1973 | Martin | 342/44 X |
| 3,868,669 | 2/1975 | Minasy | 340/280 |

FOREIGN PATENT DOCUMENTS

| 0325837 | 8/1989 | European Pat. Off. |
| 61-283979 | 12/1986 | Japan. |
| WO84/00869 | 3/1984 | PCT Int'l Appl. |
| WO86/02186 | 4/1986 | PCT Int'l Appl. |

Primary Examiner—T. H. Tubbesing
Attorney, Agent, or Firm—Rebecca A. Mapstone; James C. Kesterson; Richard L. Donaldson

[57] ABSTRACT

Where a signal is to be sent to a transponder passing by an interrogation station, and a signal is to be received back from the device, the station should include one antenna for sending, one or more separate antennas for receiving, and a circuit including a transmit portion, one or more receive portions, and a transmit-receive switch portion.

10 Claims, 4 Drawing Sheets

INTERROGATING STATION FOR IDENTIFICATION PURPOSES, WITH SEPARATE TRANSMITTING AND RECEIVING ANTENNAE

FIELD OF THE INVENTION

The invention relates to an interrogating station for interrogation and identification—using high-frequency signals—of an object, which object is moved along an interrogation path, said station being provided with an antenna system for transmitting high-frequency interrogation signals and for receiving an identification code transmitted by a transponder fixed to the object, and a transmit-receive unit for supplying an antenna control signal and for receiving the identification code respectively. Such an interrogating station is known in practice.

BACKGROUND OF THE INVENTION

Through such an interrogating station, the transponders fitted on the objects are illuminated or charged by means of high-frequency interrogation signals. Such a transponder can be a passive transponder in which on the basis of the charge produced by the electromagnetic field, a transmission of its own identification code then takes place. The antenna used in the interrogating station in the state of the art has simultaneously both the function of a transmitting or interrogating antenna and the function of a receiving antenna for receiving the identification code. The antenna can be in the form of a frame antenna which is fitted round the conveyor, and which is generally satisfactory as regards to charging of the transponders, apart from a number of small dead zones for certain transponder antenna orientations. However, the accuracy and completeness of reading or receiving decreases if several transponders are placed in different configurations in close succession on the interrogation path. This is the case particularly in a noisy environment for which a shielding would then be necessary in receiving conditions.

An attempt can be made to reduce the dimensions of the frame antenna, as a result of which a more intense electromagnetic field is obtained, but the dimensions of the frame antenna are generally fixed by the dimensions of the conveyor belt or tunnel and the pieces of luggage being moved on or in it. For that reason such a frame antenna generally has to have dimensions on the order of 38×39 inches.

SUMMARY OF THE INVENTION

One object of the invention is to solve this problem. This is achieved in an interrogation station in that the antenna system comprises at least one separate interrogating antenna and one or more separate receiving antenna, and in that a transmit-receive unit contains a transmit circuit and plural receive circuits, both circuits being separated by a transmit-receive switch.

A disadvantage of the use of separate receiving antenna was that a single antenna is never capable by itself of covering the whole interrogation path and that the connection of several receiving antenna and the processing of several receiving signals is fairly cumbersome. Nevertheless, it has surprisingly been found in the case of this embodiment that the good and strong features of the separate transmitting antenna and those of the separate receiving antenna can be maintained while avoiding the negative features. This is achieved in a relatively simple and cheap design.

The smaller receiving antenna according to the invention are generally placed equally distributed around and near the sides of the conveyor tunnel. In this design, an excellent separation capacity is obtained, through which objects with the appropriate transponders following one another in close succession can be interrogated and read with great accuracy. With the number of antenna being, e.g. eight receiving antenna round the interrogation path, a reading efficiency of 99% can be obtained with a distance of nine inches between the transponders if the conveyor is moving at a maximum speed of about 2 meters per second (or about 6 feet 7 inches per second). The transponders can in this case assume any desired spatial angle or orientation.

A further advantage is that increased receiver sensitivity is achieved, since no design trade-offs between transmit and receive functions are needed for separate antenna designs. The separate transmitting and receiving functions, i.e. with periods succeeding each other, also increase the acceptable speed of movement of the objects.

BRIEF DESCRIPTION OF THE DRAWINGS

The invention will be explained in greater detail with reference to an example of an embodiment shown in the drawings, in which.

DESCRIPTION OF THE PREFERRED EMBODIMENTS

Figure 1:
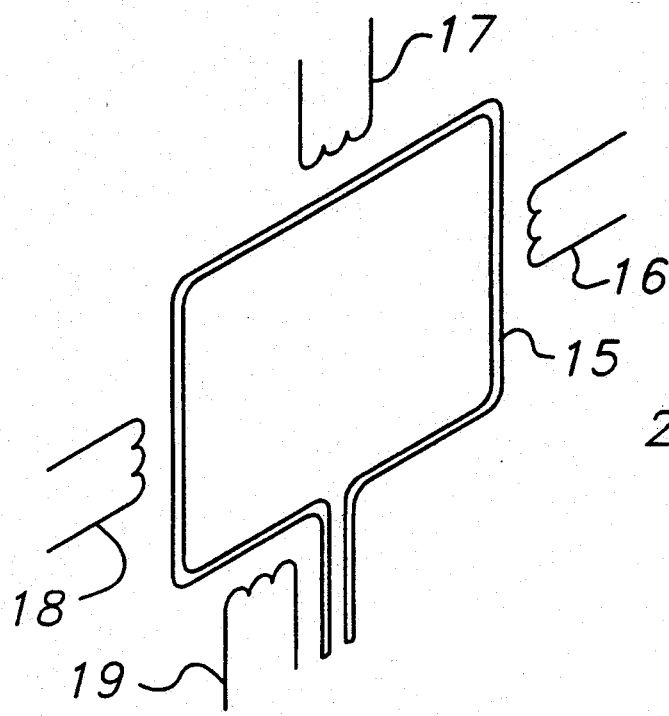
FIG. 1 shows a perspective view of an embodiment of the antenna system used in the interrogating station according to the invention.

The antenna system shown in FIG. 1 comprises a frame-shaped interrogating antenna 15 and several—in this example four—separate receiving antennae 16, 17, 18 and 19 which are disposed around the imaginary conveyor tunnel. An embodiment with e.g. eight receiving antennae, two on each side of the frame antenna, or an embodiment with two receiving antennae, each on an opposite side of the frame antenna, in addition to other orientations are also possible.

With such a large frame antenna with dimensions on the order of 38×39 inches, it is still possible to achieve a reading of two successive transponders with a distance of nine inches between them if these transponders are being moved along in the center of the conveyor. If the transponders are closer to the antenna side, an even better resolution or separation is obtained. This goes without saying if it is remembered that if more field lines pass through the transponder the reading performance will also be better.

Figure 2:
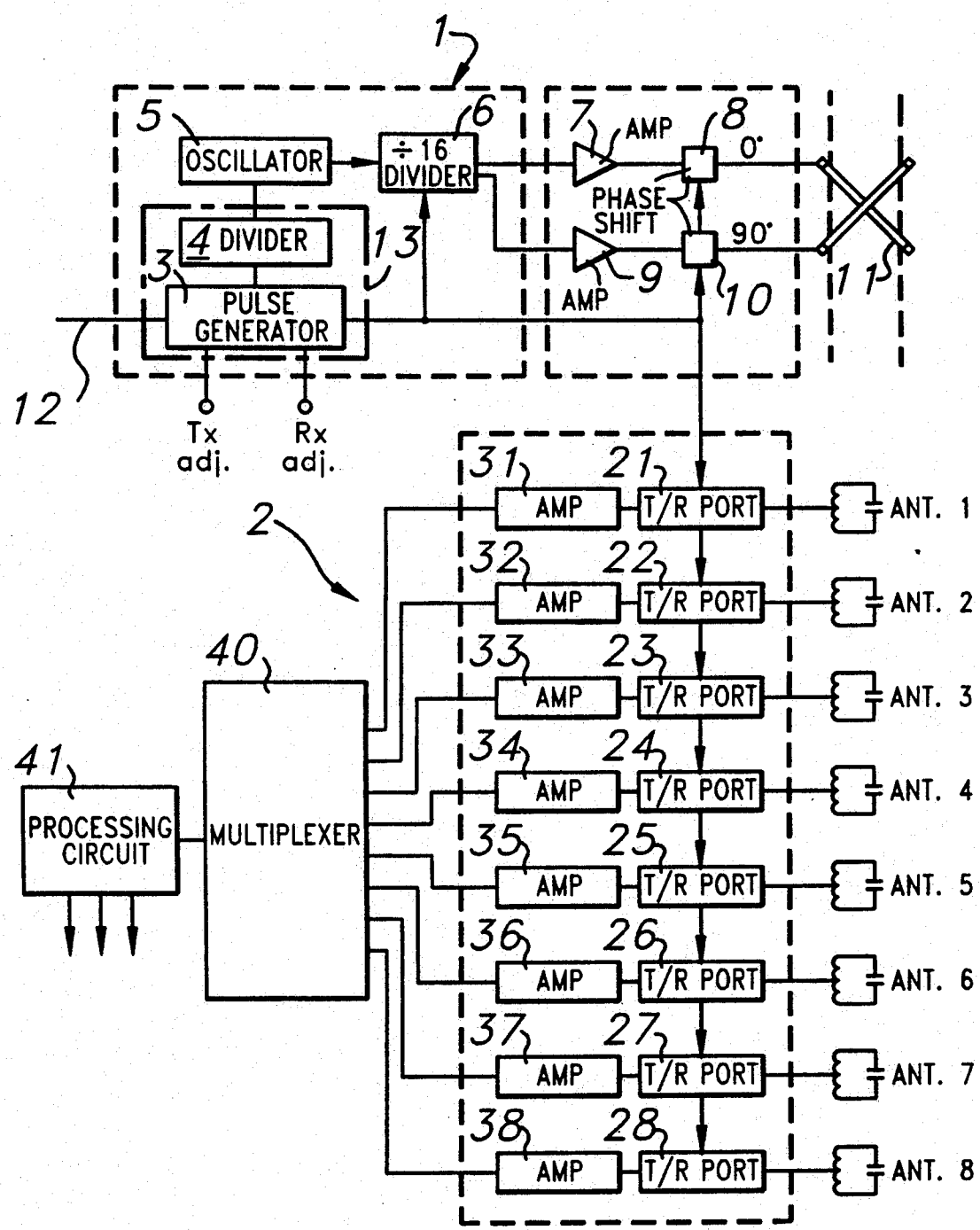
FIG. 2 shows a block diagram of an embodiment of the transmit and receive unit of the interrogating station according to the invention.

The block diagram of an embodiment according to the invention shown in FIG. 2 indicates the transmit circuit 1 and in general the receive circuit 2. In the transmit circuit 1, a transmit-receive control circuit is indicated by 13 which has a pulse generator 3 controlled by an enable/disable signal 12 and a divider 4. Reference number 5 indicates an oscillator with a frequency of 2147.2 kHz, reference number 6 is a 1:16 divider, and 7 and 9 are power amplifiers in each output of the divider 6, while 8 and 10 indicate a phase shifter of 0° and 90° respectively. It is also possible for a single power amplifier to be used to control a single frame antenna 11. By means of the adjusting elements Tx adj and Rx adj, the pulse generator 3 can be set in such a way that in a cycle of e.g. 45 to 120 msec, the transmission circuit is first enabled by a signal on line 14 for 30 to 100 msec to supply the antenna control signal or charging of the transponder, and then the receiving circuit is enabled for 15 to 20 msec to receive or read the identification code.

In the receive circuit 2, the eight receiving antennae are indicated by ant1 to ant8, and the transmit-receive ports inserted between the antennae ant1 to ant8 and the amplifiers 31 to 38 are indicated by 21 to 28. The output signals of the receive amplifiers, 31 to 38, are fed to a digital multiplexer 40. From this multiplexer an output signal is sent to a processing circuit 41 which supplies a signal for further printing, display or storage.

Figure 3:
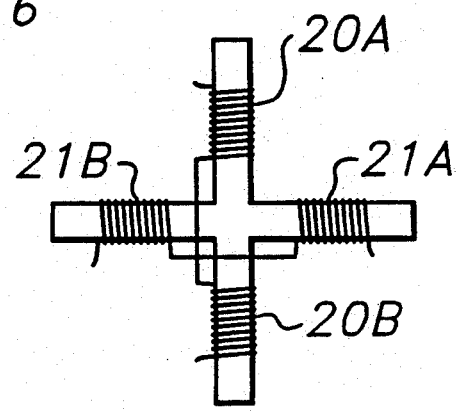
FIG. 3 gives an example of a rod antenna used.

The separate receiving antennae ant1 to ant8 can be in the form of a single rod antenna. Two receiving antennae in each case, e.g. ant1 and ant2, having reference numbers 20A, 20B, 21A and 21B can also be combined to a cross rod antenna, as shown in FIG. 3, which has a greater sensitivity to more orientations.

Figure 4:
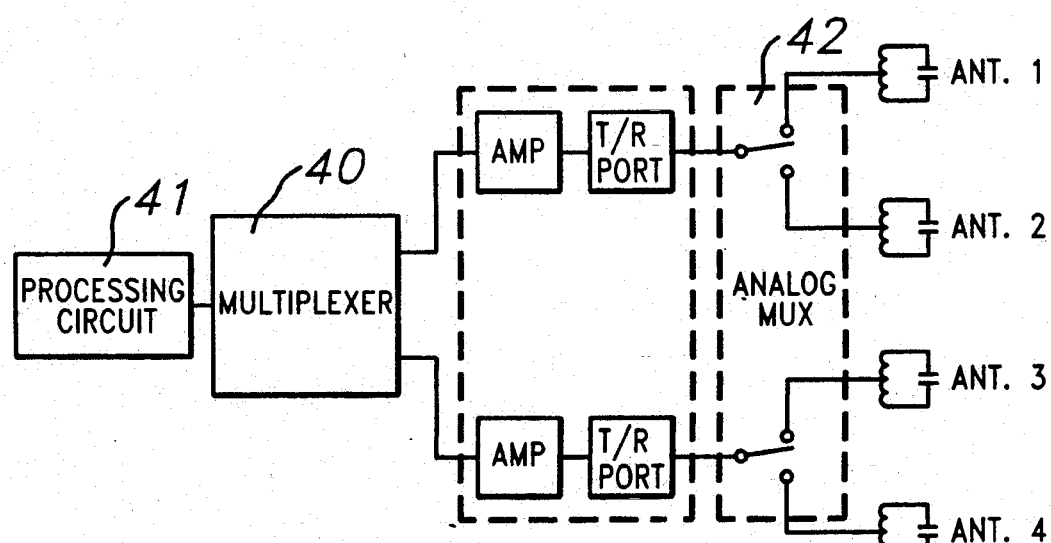
FIG. 4 gives a variant of the embodiment of the receive unit according to the invention shown in FIG. 2.

FIG. 4 shows a variant of the receive unit in which an analogue multiplexer 42 is used for the passing alternately of the signals from the—in this case four—receiving antennae ant1 to ant4. The advantage of this variant is a saving in receiving ports and amplifiers.

Figure 5:
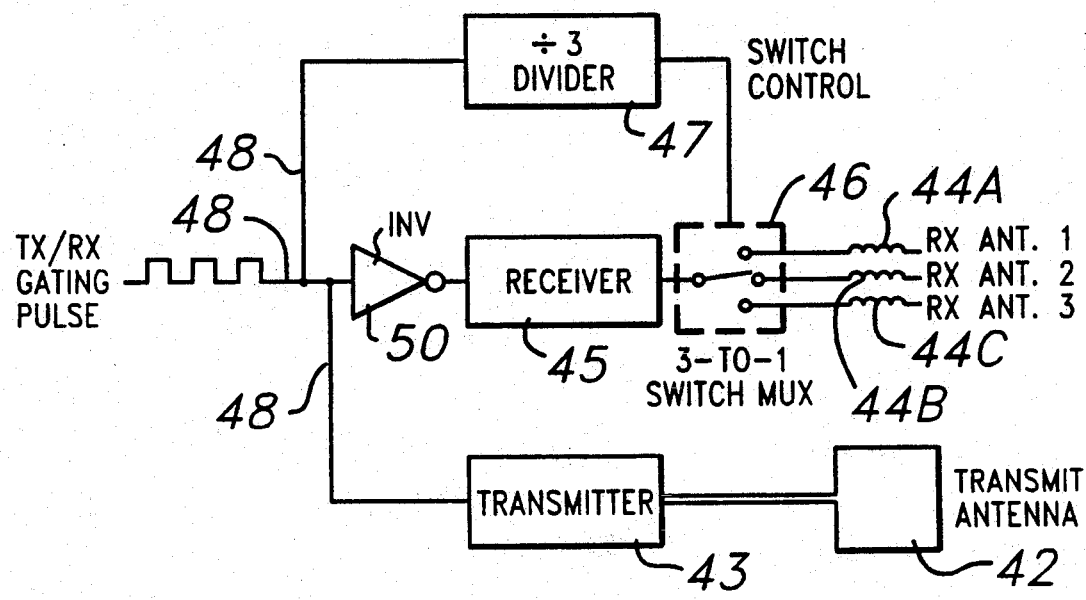
FIG. 5 shows the receiving antenna in a multiplier system.

FIG. 5 shows a multiplexed interrogation system wherein three antennae (REC1, REC2, and REC3) respond to a single TxPulse sequence.

Figure 6:
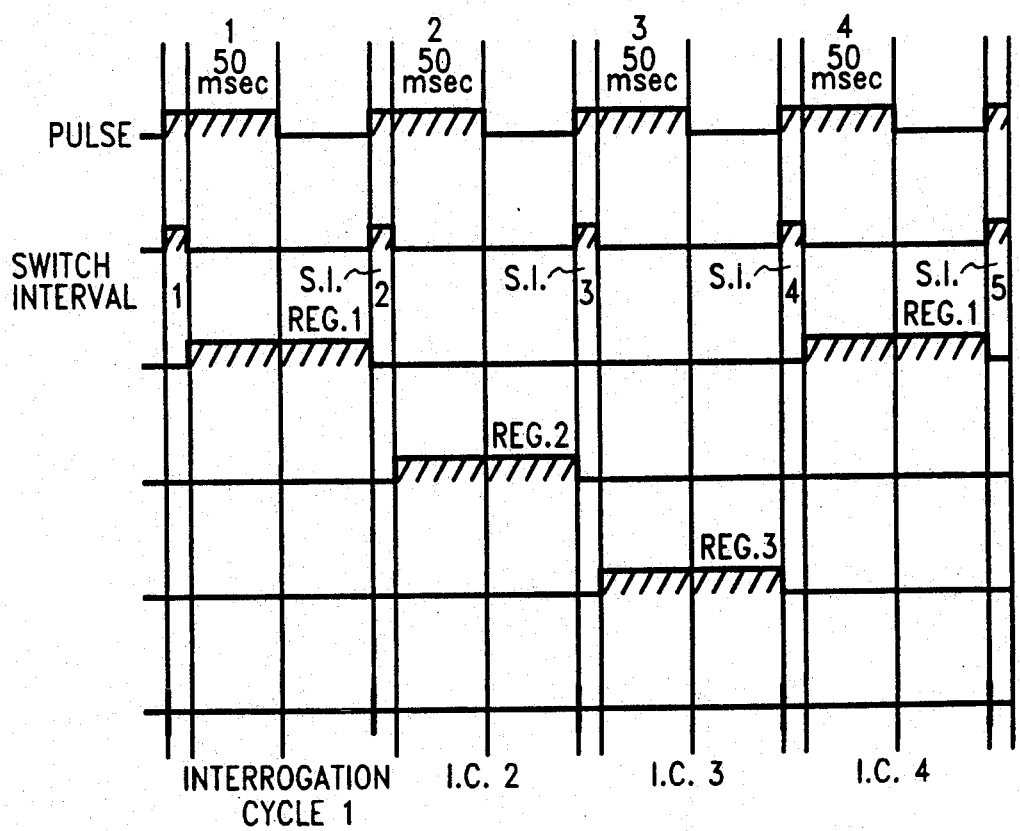
FIG. 6 shows a timing diagram of the system of FIG. 5.

FIG. 6 shows the timing circuit of the multiplexing example of FIG. 5.

As shown in FIG. 5, there is a single transmitting antenna 42 driven by transmitter 43, and three receiving antennae 44A, 44B and 44C, each of which provide a received signal to receiver 45 through 3:1 Multiplexing Switch 46 shown pictorally. Multiplexing Switch 46 is controlled by a divide by 3 Divider Circuit 47 such that each receiving antennae 44A, 44B and 44C is respectively addressed sequentially in response to a gating pulse on line 48. As shown from FIGS. 5 and 6, the Transmitter 43 is triggered to start transmitting an interrogation pulse at the leading edge of the gating pulse. Likewise, the Multiplexing Switch 46 switches the receiving antenna at the leading edge of the pulse to assure sufficient time to connect the appropriate antenna at the termination of the interrogation pulse. The trigger or gating pulse on line 48, however, passes through Inverter 50 prior to arriving at Receiver 45 such that the Receiver 45 does not turn on until the end or lagging edge of the gating pulse.

From FIG. 6, it will be observed that transmission and reception are not contemporaneous, but the transmit pulse and reception period do overlap in time. It will further be appreciate that in an alternative embodiment of the present invention (FIG. 2) a plurality of receiving antennae may be simultaneously operative.

Figures 7, 8:
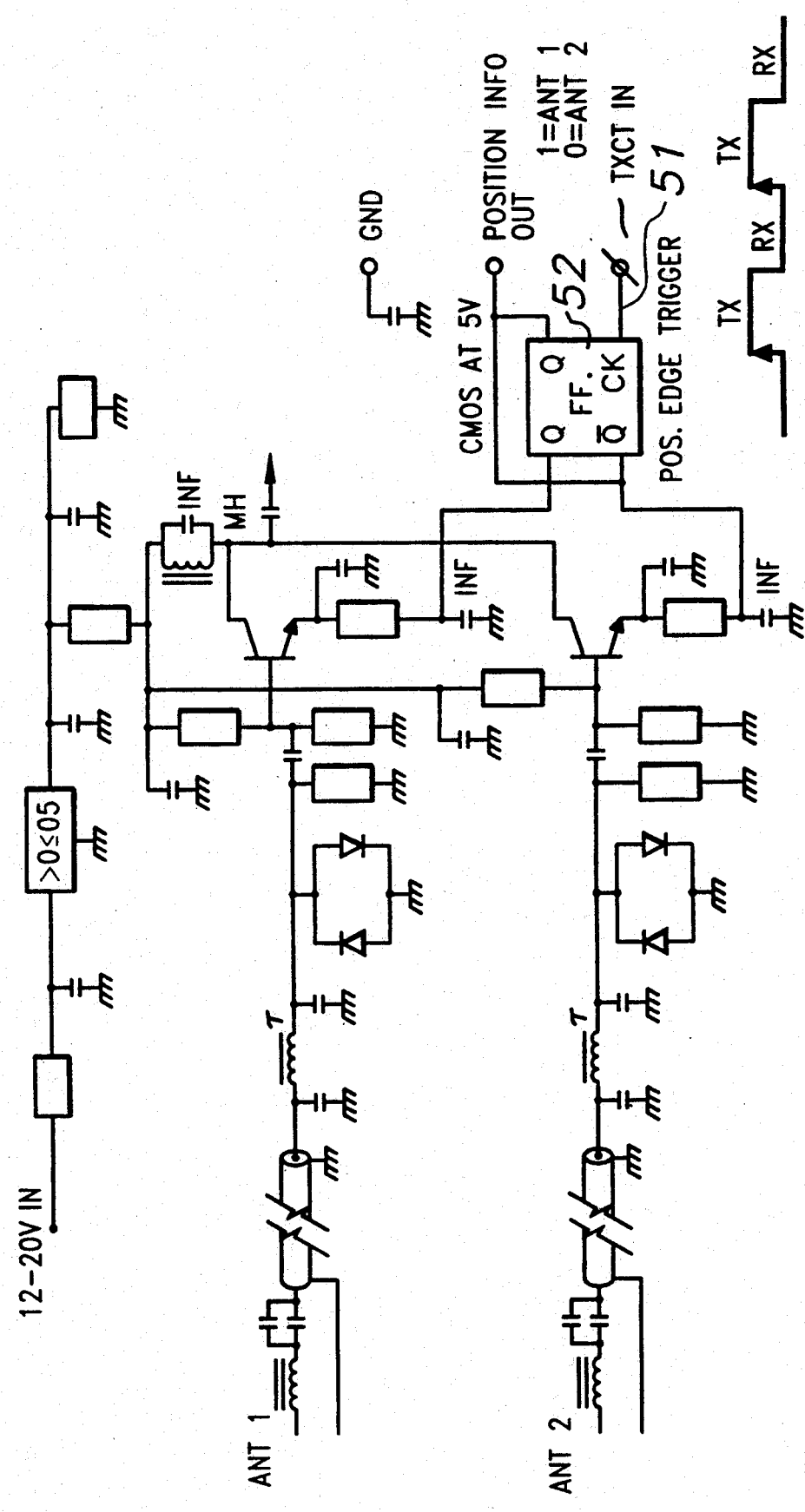
FIG. 7 shows a two receiving antennae system controlled by a Flip Flop.
FIG. 8 shows a transmit/receiver control pulse signal for switching the two receiving antennae of FIG. 7.

FIGS. 7 and 8 show an alternate embodiment of a receiving antenna circuit having two (2) receiving antennae and a transmit/receiver control signal for switching the two receiving antennae respectively. Generally, as indicated, a square wave transmit and receive control signal (FIG. 8) is applied to the clock input 51 of a Flip Flop 52 having a Q and a $\bar{Q}$ output representing a "1" and "0" respectively. As indicated, Flip Flop 52 triggers or changes state on the positive or leading edge of the input control signal at input 51. Consequently, antenna 1 and antenna 2 alternate as the active antenna. In the embodiment shown in FIG. 7, antenna 1 is active at the Q (or "1") output of Flip Flop 52, and antenna 2 is active at the $\bar{Q}$ (or "0") output.

I claim:

1. A system for interrogation and identification of an object moved along an interrogation path, comprising:
    an antenna system for transmitting interrogation signals and for receiving an identification code transmitted by a transponder fixed to the object, and a transmit-receive unit for supplying an antenna control signal and for receiving the identification code respectively, wherein, the antenna system comprises at least one separate interrogating antenna and more than one separate receiving antennae, and the transmit-receive unit contains a transmit circuit and plural receive circuits, both circuits being separated by a transmit-receive switch and for each receiving antenna there exists a corresponding receive circuit.

2. The system according to claim 1, wherein the transmitting antenna is in the form of a frame antenna which is disposed around the interrogation path, and wherein said more than one receiving antennae comprises at least four antennae which are disposed equally around the interrogation path in a plane running essentially at right angles to the lengthwise direction of the interrogation path.

3. A method for interrogation and identification of an object having a transponder fixed thereto and moving along an interrogation path comprising the steps of:
    generating interrogation signals by a transmit/receive unit which includes a transmit circuit and plural receive circuits;
    transmitting said interrogation signals from at least one frame antenna disposed around said interrogation path to a transponder attached to said object moving along said interrogation path;
    receiving said interrogation signal by said transponder and transmitting an identification code from said transponder;
    receiving said identification code by more than one separate receiving antennae, each connected to a corresponding one of the receive circuits in said receive unit; and
    maintaining said transmit circuit and said plural receive circuit separate by a transmit-receive switch.

4. The method according to claim 3 and further comprising the steps of:
    controlling the interrogating antenna by the transmit circuit for an interrogation period of between about 30 to 100 msec, and then connecting the separate receiving antennae to the receive circuit corresponding to each receiving antenna for a receiving period of between about 15 to 20 msec.

5. The method of claim 3 further comprising the step of controlling said transmit-receive switch such that transmission and reception do not occur contemporaneously.

6. The method as claimed in claim 5 wherein reception and transmission overlap in time.

7. The method as claimed in claim 5 wherein during reception a plurality of receiving antennae are simultaneously operative.

8. The method of claim 3 and further comprising the step of controlling said transmit-receive switch such that during a reception period at least one of said receiving antennae is inoperative.

9. The method as claimed in claim 8 and wherein during reception a selected one of said receiving antennae is operative.

10. The method as claimed in claim 9 and wherein during a subsequent reception period a different selected one of said plurality of receiving antennae is operative.

* * * * *